(12) United States Patent
Romero et al.

(10) Patent No.: US 10,442,377 B2
(45) Date of Patent: Oct. 15, 2019

(54) AUTO-LOCK ENERGY ABSORBER FOR PEDESTRIAN PROTECTION AND LOW SPEED DAMAGEABILITY TARGETS

(71) Applicant: Ford Global Technologies, LLC, Dearborn, MI (US)

(72) Inventors: Jorge Romero, Naucalpan (MX); Oscar Saavedra, Toluca (MX); Jesús Marini, Ciudad de México (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 51 days.

(21) Appl. No.: 15/697,654

(22) Filed: Sep. 7, 2017

(65) Prior Publication Data

US 2019/0071040 A1 Mar. 7, 2019

(51) Int. Cl.
*B60R 19/18* (2006.01)
*B60R 21/34* (2011.01)

(52) U.S. Cl.
CPC .............. *B60R 19/18* (2013.01); *B60R 21/34* (2013.01); *B60R 2019/186* (2013.01); *B60R 2019/1893* (2013.01)

(58) Field of Classification Search
CPC ............ B60R 19/18; B60R 2019/1893; B60R 2019/186; B60R 21/34
USPC ........................................................ 293/133
See application file for complete search history.

(56) References Cited

U.S. PATENT DOCUMENTS

| | | | |
|---|---|---|---|
| 6,050,624 A * | 4/2000 | Kim | B60R 19/28 293/132 |
| 6,726,262 B2 | 4/2004 | Marijnissen et al. | |
| 6,871,889 B2 | 3/2005 | Ericsson | |
| 8,246,091 B1 | 8/2012 | Jayasuriya et al. | |
| 9,434,334 B2 | 9/2016 | Marur et al. | |
| 2010/0102580 A1 | 4/2010 | Brooks et al. | |
| 2012/0323447 A1 | 12/2012 | Niesse et al. | |
| 2017/0144618 A1 * | 5/2017 | Martini | B60R 19/03 |

FOREIGN PATENT DOCUMENTS

| | | |
|---|---|---|
| KR | 100410506 B1 | 12/2003 |
| WO | 2016/096515 A1 | 6/2016 |

* cited by examiner

*Primary Examiner* — Joseph D. Pape
*Assistant Examiner* — Dana D Ivey
(74) *Attorney, Agent, or Firm* — Carlson, Gaskey & Olds, P.C.

(57) ABSTRACT

A bumper assembly for a motor vehicle includes an energy absorber providing a variable stiffness for different displacements. The energy absorber includes a skin portion attached to a bumper beam, a rib pivotally attached to an end of the skin portion and a reinforced element attached to an end of the rib. The rib is movable from a first position that provides a first stiffness for a first displacement to a second position providing a second stiffness greater than the first stiffness over a second displacement.

18 Claims, 4 Drawing Sheets

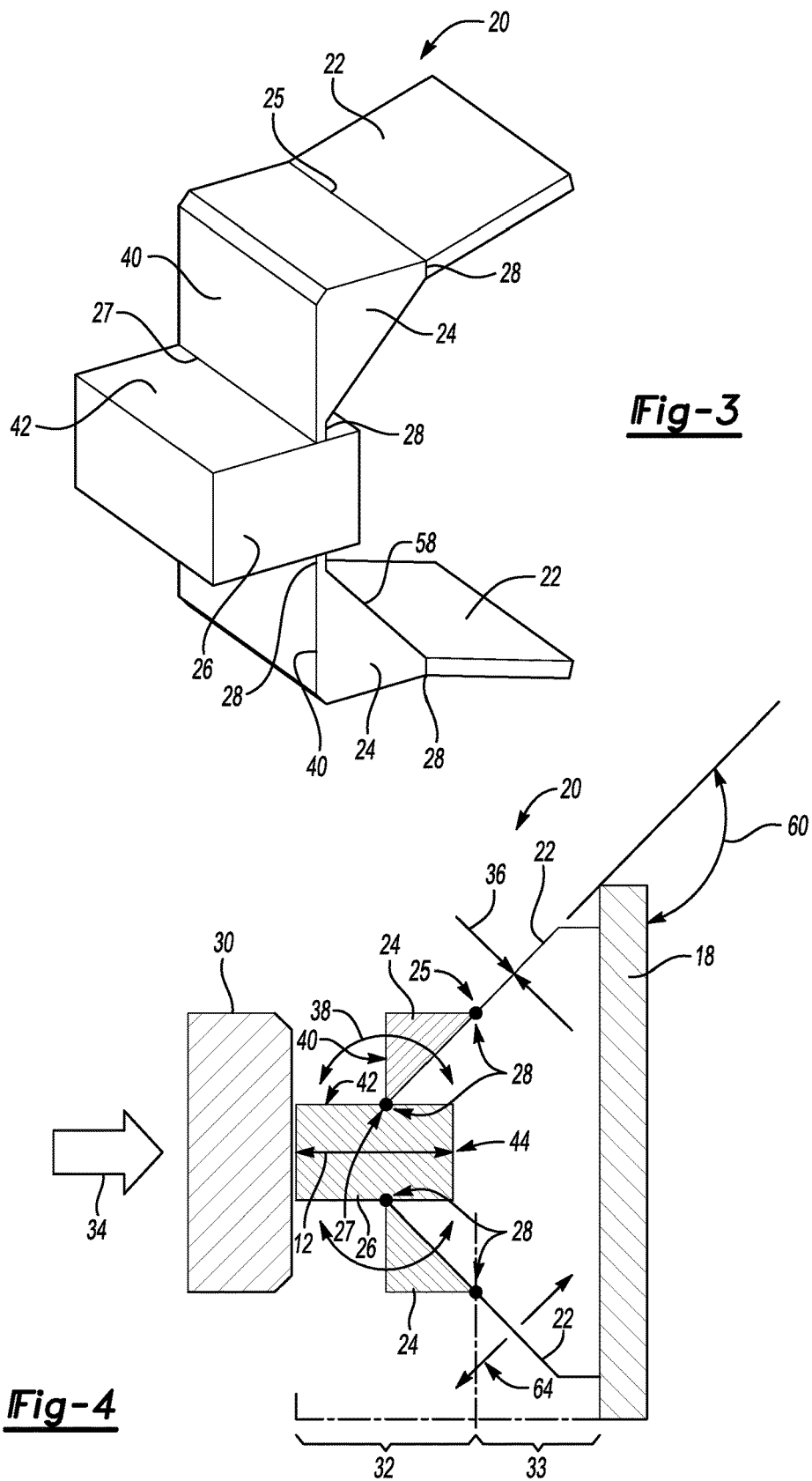

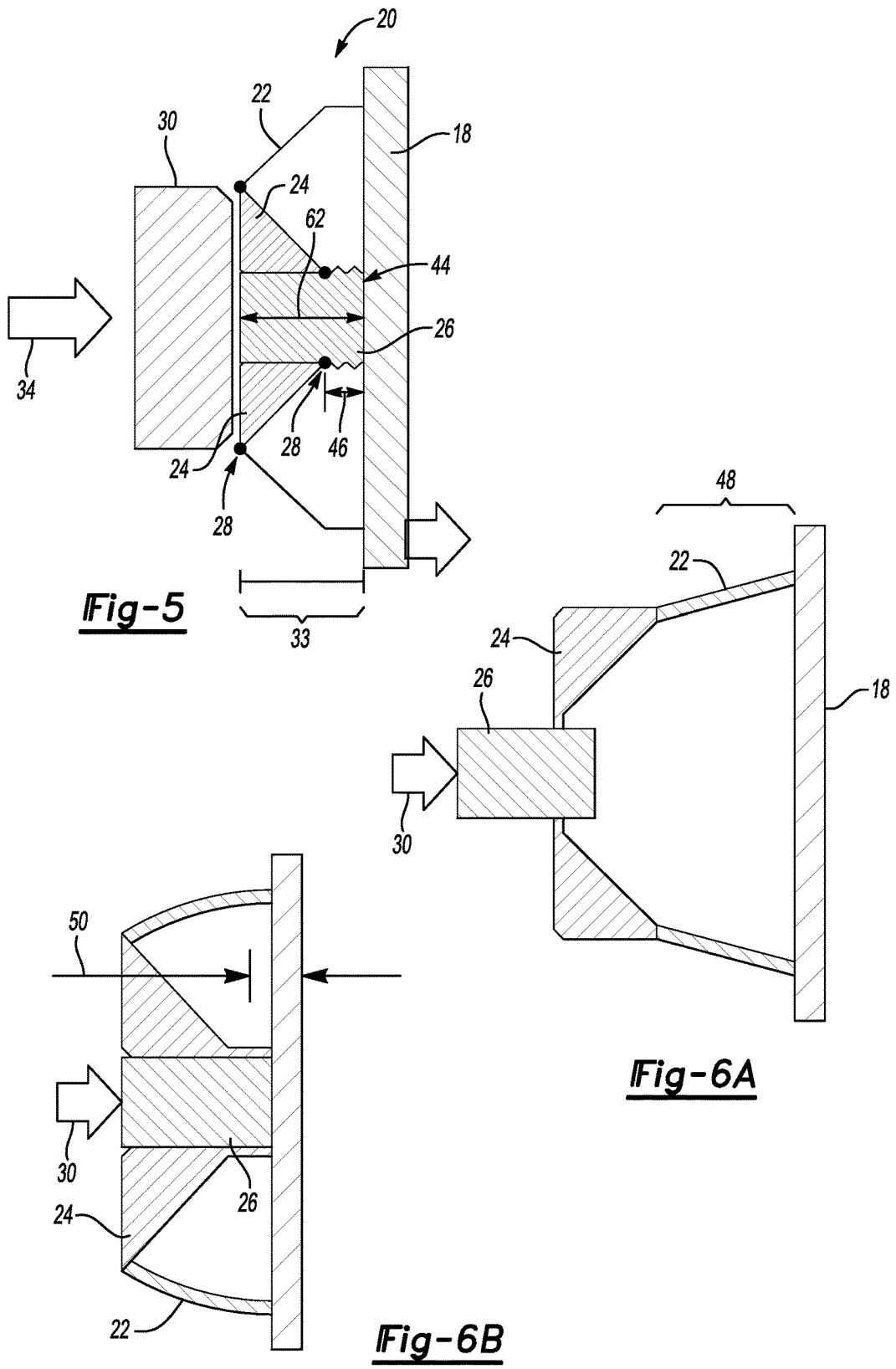

AUTO-LOCK ENERGY ABSORBER FOR PEDESTRIAN PROTECTION AND LOW SPEED DAMAGEABILITY TARGETS

TECHNICAL FIELD

This disclosure relates to an energy absorber for an automobile that absorbs energy to accommodate pedestrian protection standards while also including a stiffness that minimizes low speed damageability.

BACKGROUND

Vehicles include bumpers and energy absorbers that perform contrasting functions of absorbing and dispersing energy in some circumstances while providing a stiffness that prevents damage to the vehicle during low speed impacts. Vehicle bumpers are therefore subjected to target performance requirements to provided energy absorption to protect pedestrians. The same bumpers also must be sufficiently stiff to minimize damage to the vehicle during low speed impacts. Additionally, any energy absorbing structure must also accommodate vehicle design aesthetics and space limitations.

SUMMARY

An apparatus according to an exemplary aspect of the present disclosure includes, among other things, an energy absorber for a motor vehicle including a reinforced element, a first rib and a second rib attached to the reinforced element in a first position to provide a first stiffness and a skin portion supporting the first rib, the second rib and the reinforced element, wherein the first rib and the second rib are movable from the first position to a second position to provide a second stiffness greater than the first stiffness.

In a further non-limiting embodiment of the foregoing energy absorber, the skin portion is an elongated member with a thickness and the first stiffness is defined by the thickness of the skin portion.

In a further non-limiting embodiment of the foregoing energy absorber, the thickness is between 0.0020 and 0.0035 inches.

In a further non-limiting embodiment of the foregoing energy absorber, the skin portion is disposed at an angle relative to a static structure and the reinforced element includes a longitudinal length that partially defines the second stiffness.

In a further non-limiting embodiment of the foregoing energy absorber the reinforced element is a solid rectangle in cross-section.

In a further non-limiting embodiment of the foregoing energy absorber, the first rib and the second rib substantially define a triangle in cross-section.

In a further non-limiting embodiment of the foregoing energy absorber, the skin portion has a first side between the first rib and a static structure and a second side between the second rib and the static structure.

In a further non-limiting embodiment of the foregoing energy absorber, the static structure is a bumper beam.

In a further non-limiting embodiment of the foregoing energy absorber, the reinforced element, first rib, second rib and skin portion are plastic.

In a further non-limiting embodiment of the foregoing energy absorber, the reinforced element, first rib, second rib and skin portion are the same material with a common density.

A bumper assembly for a motor vehicle according to another exemplary aspect of the present disclosure includes, among other things, a bumper beam, a skin portion attached to the bumper beam and extending from the bumper beam, a rib pivotally attached to an end of the skin portion, and a reinforced element attached to an end of the rib, wherein the rib is movable from a first position providing a first stiffness to a second position providing a second stiffness greater than the first stiffness.

In a further non-limiting embodiment of the foregoing bumper assembly, the rib includes a contact surface movable into engagement with a side of the reinforced element in the second position.

In a further non-limiting embodiment of any of the foregoing bumper assemblies, the rib comprises a triangle in cross-section and the contact surface comprises a side opposite a hypotenuse of the triangle.

In a further non-limiting embodiment of any of the foregoing bumper assemblies, one end of the hypotenuse of the triangle is attached to the skin portion and the other end is attached to the reinforced element.

In a further non-limiting embodiment of any of the foregoing bumper assemblies, the skin portion includes a wall thickness that defines the first stiffness.

In a further non-limiting embodiment of any of the foregoing bumper assemblies, the first stiffness is defined over a first displacement and the second stiffness is defined over a second displacement following the first displacement.

In a further non-limiting embodiment of any of the foregoing bumper assemblies, the second stiffness is defined by a longitudinal length of the reinforced element.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 is a perspective view of a portion of the energy absorber.

FIG. 4 is a cross-section of a portion of an example non-collapsed energy absorber.

FIG. 5 is a cross-section of the example collapsed energy absorber.

FIG. 6A is a cross-section of the example energy absorber in a first position.

FIG. 6B is a cross-section of the example absorber in a second position.

DETAILED DESCRIPTION

Figure 1:
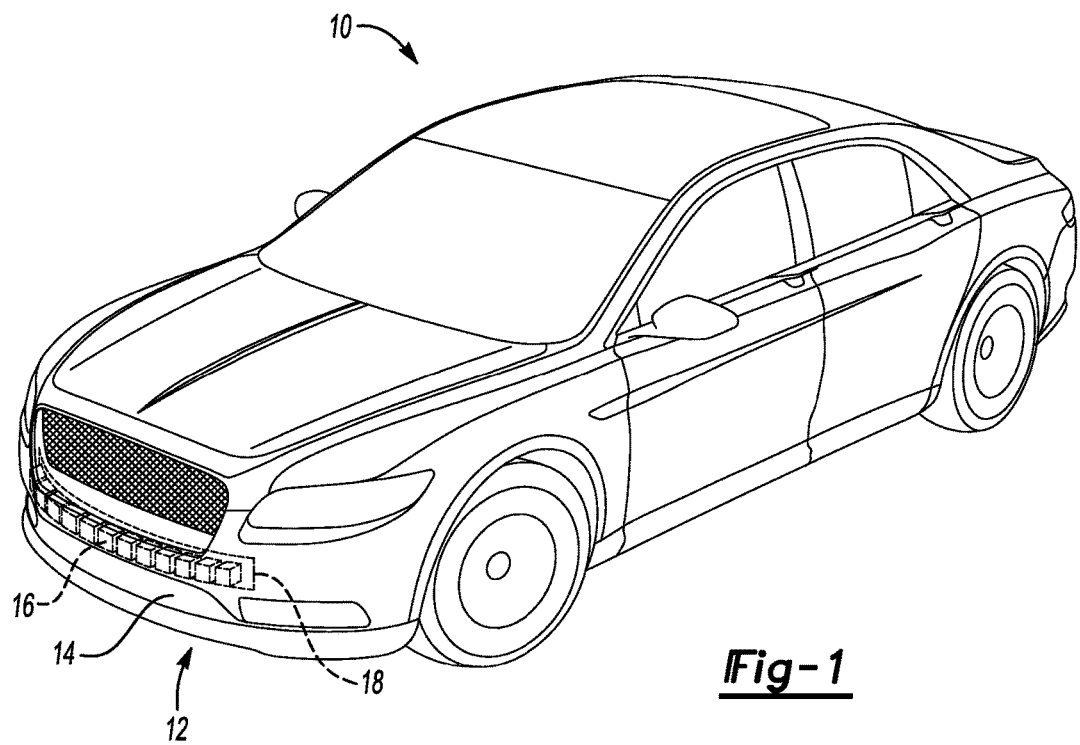
FIG. 1 is a schematic representation of a motor vehicle including an example bumper assembly.

Referring to FIG. 1, a motor vehicle 10 is schematically illustrated and includes a bumper assembly 12 that is disposed under a front facia 14. The bumper assembly 12 includes an energy absorber 16 that is attached to a bumper beam 18.

Figure 2:
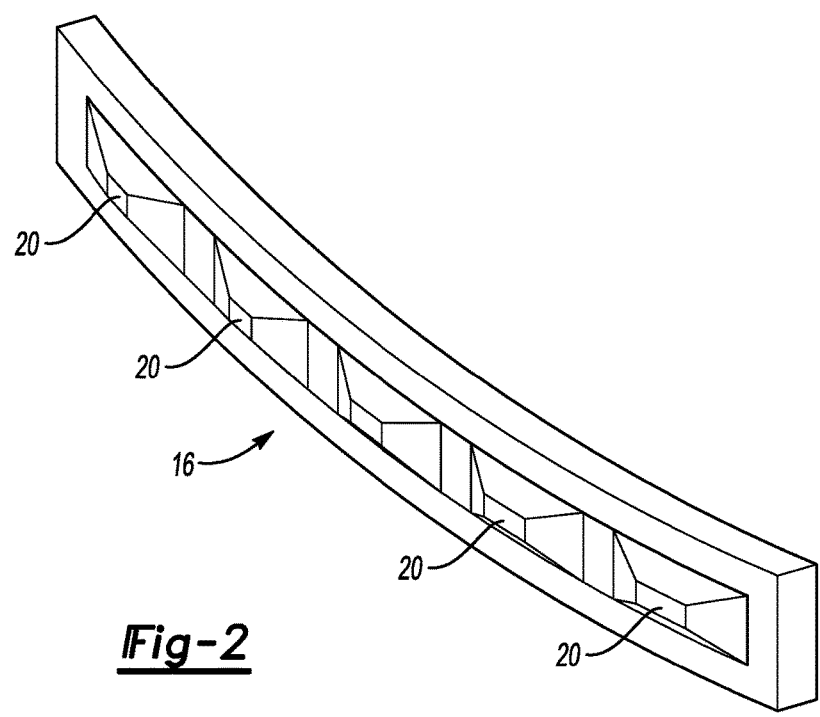
FIG. 2 is a schematic view of an example energy absorber.

Referring to FIGS. 2 and 3 with continued reference to FIG. 1, the example energy absorber 16 includes a plurality of absorbers 20. The absorbers 20 are disposed along the front width of the energy absorber 16 and motor vehicle 10. The example energy absorber 16 includes a plurality of absorbers 20 spaced apart along the width of the energy absorber 16 and provide a variable stiffness to accommodate different energy absorption requirements depending on displacement and applied force. The energy absorber 20 may also be a single continuous cross-section across the front width of the motor vehicle.

Referring to FIG. 3, the example absorber 20 includes skin portions 22 that are attached to ribs 24. The ribs 24 are in turn attached to a reinforced element 26. The skin portions 22 are pivotally attached by hinges 28 to the ribs 24. The ribs 24 are in turn attached by way of hinges 28 to the reinforced element 26. The hinge portions 28 are thin sections extending between different portions that are sufficiently flexible to enable relative pivoting movement.

The skin portions 22 are relatively thin walls that extend from the bumper beam 18. The ribs 24 are substantially triangular in cross-section. The reinforced element 26 is substantially rectangular and disposed between ribs 24.

The substantially triangular cross-section of each of the ribs 24 includes a hypotenuse 58 that extends between a first side 25 attached to the skin portion 22 and a second side 27 attached to the reinforced element 26. A side 40 is disposed opposite the hypotenuse 58 and contacts a side 42 of the reinforced element 26 to provide an auto lock condition that provides a desired stiffness.

Referring to FIG. 4, the example absorber 20 is shown in cross-section with an impactor 30 applying a force 34. The absorber 20 provides variable stiffness for different displacement ranges to comply with different impact requirements.

A first requirement is to provide relatively low stiffness and more energy absorption to provide pedestrian protection. A first displacement is schematically illustrated at 32 and is provided by the flexing of the skin portions 22. The skin portions 22 are disposed on either side of the reinforced element 26. During the initial impact of the impactor 30, the skin portions 22 will flex depending on a thickness 36 of the walls.

The skin portions 22 are provided with the thickness 36 that provides a first stiffness over the first displacement indicated at 32. During the first displacement 32, the skin portions 22 will flex in a direction indicated by arrows 65. The ribs 24 will not flex but will bend about the hinges 28 between each of the ribs 24 and the reinforced element 26. Accordingly, the first stiffness is provided substantially by the skin portion 22.

The skin portions 22 have a wall thickness 36 and attach to the bumper beam 18. In one disclosed example, the wall thickness 36 is between 0.0020 and 0.0035 inches (0.0508 to 0.0889 mm). In another disclosed embodiment, the wall thickness of the skin portions 22 are between 0.0026 and 0.0030 inches (0.06604 to 0.07462 mm). It should be appreciated that although a specific range of wall thickness is disclosed by way of example, the wall thickness may be varied to provide a desired stiffness of the skin portions 22 for the first displacement 32.

Referring to FIG. 5, upon further application of force, the ribs 24 will rotate about the hinge 28 such that the side 40 of each rib 24 will contact sides 42 of the reinforced element 26 and collapse into an auto locked position. In the auto locked position shown in FIG. 5, the ribs 24 are collapsed onto either side of the reinforced element 26 and the skin portions 22 on each side of the ribs 24 no longer contributes to the stiffness.

Instead, a second stiffness that is greater than the first stiffness is provided by the reinforced element 26. The reinforced element 26 includes a length 62 that is tailored to determine the second stiffness over the second displacement range indicated at 33. The second displacement range 33 occurs when the reinforced element 26 is in contact with the static structure of the bumper beam 18 and the skin portions 22 no longer control energy absorption. In the auto locked position shown in FIG. 5, the reinforced element 26 moves inwardly to contact the bumper beam 18. The length 62 can be adjusted to tailor when the second stiffness will be implemented based on displacement. Once the reinforced element 26 engages the static structure of the bumper beam 18, the second stiffness governs and is determined by the material properties of the reinforced element 26.

In one embodiment, each of the skin portions 22, ribs 24 and reinforced element 26 are fabricated from the same plastic material. The plastic material includes differences in thickness that provide the variation of stiffness over the different displacements. Additionally, the different geometries of the skin portions 22, ribs 24 and reinforced element 26 provide the desired variations in stiffness.

A third displacement indicated at 46 is generated solely on the material properties of the reinforced element 26. The material and density stiffness provided by the reinforced element 26 will enable some additional displacement once the reinforced element 26 has contacted the bumper beam 18. Any additional displacement will be based on the amount that the material making up the reinforced element 26 will collapse under the applied force 34.

Referring to FIG. 6A with continued reference to FIGS. 4 and 5, the example energy absorber 16 is shown in a first position where the first low stiffness provides pedestrian protection by absorbing the impact and spreading any forces incurred over a larger area over a greater displacement. The first low stiffness is tunable by providing a specific geometry, angle and thickness of the skin portions 22. In this example the skin portions 22 include a wall thickness 36 between about 0.0020 and 0.0035 inches (0.0508 to 0.0889 mm). Additionally, the skin portions 22 are disposed at the angle 60 relative to the bumper beam 18 to provide movement in the direction indicated by arrows 64 shown in FIG. 4. In the disclosed example embodiment the angle 60 is 45 degrees. It should be appreciated that the angle 60 may vary to tailor the first stiffness as required.

Referring to FIG. 6B, with continued reference to FIGS. 4 and 5, the energy absorber 16 is shown in the auto locked condition where the ribs 24 have flipped about the hinges 28 and collapsed against sides 42 of the reinforced element 26. The ribs 24 rotate against the reinforced element 26 such that the side opposite 40 the hypotenuse of the triangular cross-section engage sides of the reinforced element 26. In this position, the ribs 24 and the reinforced element 26 provide a second stiffness once the reinforced element contacts the static structure 18. Until the reinforced element 26 contacts the static structure, the skin portions 22 remain in operation and provide displacement at the first stiffness. Once the reinforced element 26 engages the static bumper beam 18, the skin portions 22 no longer provide the stiffness but instead, the reinforced element 26 provides the second stiffness over the second displacement range.

Figure 6C:
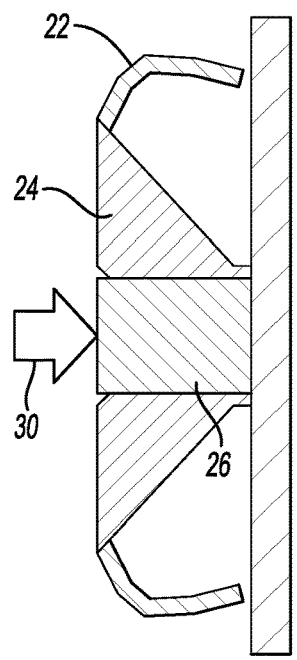
FIG. 6C is a schematic view of the example energy absorber in a collapsed condition.

Referring to FIG. 6C, the energy absorber 16 is shown in a collapsed condition where the reinforced element 26 has been collapsed against the static bumper beam 18. In this condition, the reinforced element 26 is being physically crushed and is no longer absorbing energy through flexing of the skin portion 22. Instead, in the condition illustrated in FIG. 6C, the reinforced element 26 is being crushed and the material properties provided by the reinforced element 26 provide the stiffness.

Figure 7:
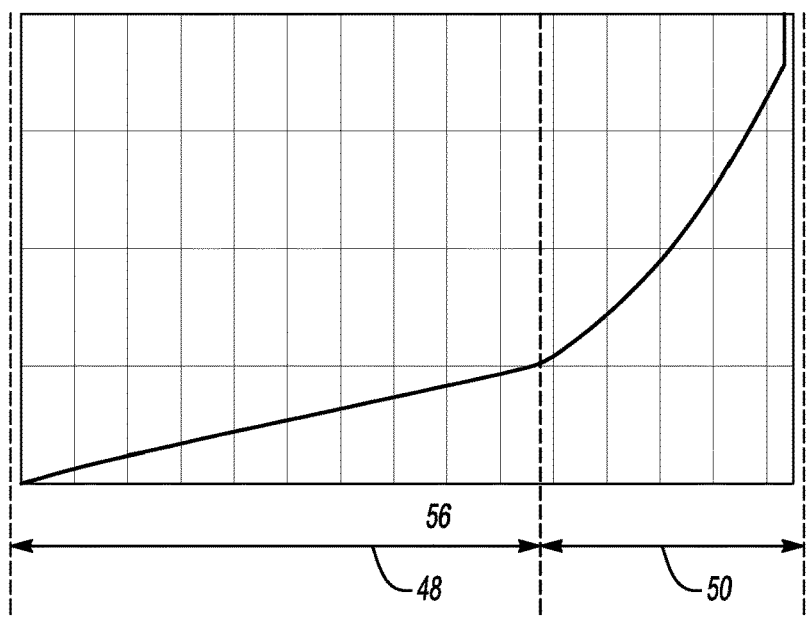
FIG. 7 is a graph illustrating displacement over of the example energy absorber for a given force.

Referring to FIG. 7, the applied force 54 is shown for a given displacement 56 for the example energy absorber 16 in a graph 52. Over a first displacement 48, a first stiffness is provided by the skin portions 22. Over the first displacement 48, the force is absorbed by the energy absorber 16 and is not substantially increased to provide the pedestrian protection target values.

Over a second displacement range 50, when the ribs 24 have auto locked onto the reinforced element 26, the force substantially increases as the reinforced element 26 engages the static structure of the bumper beam 18. In this condition, the reinforced element 26 provides a much stiffer displacement to protect elements within the front portion of the motor vehicle to provide low speed damage protection. The high stiffness provides for the low speed damage protection requirements where the various vehicle parts are protected during low speed impacts to reduce potential damage to the vehicle.

Accordingly, the example energy absorber 16 includes features and geometry that provide a variable stiffness over a displacement that accommodates both pedestrian protection targets where forces are absorbed over a high amount of displacement and a second stiffness where a higher stiffness is provided over a smaller displacement to protect structures of the motor vehicle during a low speed impact event.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An energy absorber for a motor vehicle comprising:
   a reinforced element;
   a first rib and a second rib are pivotally attached to the reinforced element by corresponding first and second hinge portions, the first rib and the second rib provide a first stiffness in a first position, in the first position the reinforced element extends forward of the first rib and the second rib; and
   a skin portion supporting the first rib, the second rib and the reinforced element, wherein the first rib and the second rib are movable from the first position to a second position to provide a second stiffness greater than the first stiffness, wherein in the second position, the first and second hinge portions move with the reinforced element and the first rib and the second rib rotate about the corresponding first and second hinged portions into mating contact with the reinforced element.

2. The energy absorber for a motor vehicle as recited in claim 1, wherein the skin portion is an elongated member with a thickness and the first stiffness is defined by the thickness of the absorber.

3. The energy absorber for a motor vehicle as recited in claim 2, wherein the thickness is between 0.0020 and 0.0035 inches.

4. The energy absorber for a motor vehicle as recited in claim 2, wherein the skin portion is disposed at an angle relative to a static structure.

5. The energy absorber for a motor vehicle as recited in claim 1, wherein the reinforced element includes a longitudinal length that partially defines the second stiffness.

6. The energy absorber for a motor vehicle as recited in claim 1, wherein the reinforced element is a solid rectangle in cross-section.

7. The energy absorber for a motor vehicle as recited in claim 1, wherein the first rib and the second rib substantially define a triangle in cross-section.

8. The energy absorber for a motor vehicle as recited in claim 1, wherein the skin portion has a first side between the first rib and a static structure and a second side between the second rib and the static structure.

9. The energy absorber for a motor vehicle as recited in claim 8, wherein the static structure is a bumper beam.

10. The energy absorber for a motor vehicle as recited in claim 1, wherein the reinforced element, first rib, second rib and skin portion are plastic.

11. The energy absorber for a motor vehicle as recited in claim 1, wherein the reinforced element, first rib, second rib and skin portion are the same material with a common density.

12. A bumper assembly for a motor vehicle comprising:
    a bumper beam;
    a skin portion attached to the bumper beam and extending from the bumper beam;
    a rib pivotally attached to an end of the skin portion; and
    a reinforced element pivotally attached to an end of the rib at a hinge portion, wherein the rib is movable from a first position providing a first stiffness to a second position providing a second stiffness greater than the first stiffness, wherein in the first position the reinforced element extends forward of the rib and in the second position the hinge portion moves with the reinforced element causing the rib to rotate about the hinge portion into mating contact with the reinforced element.

13. The bumper assembly for a motor vehicle as recited in claim 12, wherein the rib includes a contact surface movable into engagement with a side of the reinforced element in the second position.

14. The bumper assembly for a motor vehicle as recited in claim 13, wherein the rib comprises a triangle in cross-section and the contact surface comprises a side opposite a hypotenuse of the triangle.

15. The bumper assembly for a motor vehicle as recited in claim 14, wherein one end of the hypotenuse of the triangle is attached to the skin portion and the other end is attached to the reinforced element.

16. The bumper assembly for a motor vehicle as recited in claim 12, wherein the skin portion includes a wall thickness that defines the first stiffness.

17. The bumper assembly for a motor vehicle as recited in claim 16, wherein the first stiffness is defined over a first displacement and the second stiffness is defined over a second displacement following the first displacement.

18. The bumper assembly for a motor vehicle as recited in claim 17, wherein the second stiffness is defined by a longitudinal length of the reinforced element.

* * * * *